United States Patent [19]

Pacini et al.

[11] 4,282,104

[45] Aug. 4, 1981

[54] ANTICARCINOGEN ADDITIVE FOR WATER SUPPLIES

[76] Inventor: August J. Pacini, 1065 Belle Meade Island Dr., Miami, Fla.

[21] Appl. No.: 770,445

[22] Filed: Feb. 22, 1977

Related U.S. Application Data

[63] Continuation of Ser. No. 596,368, Jul. 16, 1975, abandoned.

[51] Int. Cl.³ .............................................. C02F 1/76
[52] U.S. Cl. ................................... 210/754; 210/756; 210/763; 210/764; 210/908
[58] Field of Search ...................... 210/42, 50, 59, 62, 210/64, 721, 749, 753, 754, 755, 756, 758, 763, 764, 908; 424/141, 280

[56] References Cited

U.S. PATENT DOCUMENTS

| | | | |
|---|---|---|---|
| 3,026,208 | 3/1962 | Szent-Gyorgyi | 210/59 |
| 3,329,607 | 7/1967 | Colobert et al. | 210/64 |
| 3,681,492 | 8/1972 | Kotzbauer | 210/64 |

*Primary Examiner*—Peter A. Hruskoci

[57] ABSTRACT

Ascorbic acid, preferably enhanced in combination with copper sulfate, is an effective additive for water supplies in preventing the development or reducing the concentration of carcinogenic materials contained therein.

3 Claims, No Drawings

ANTICARCINOGEN ADDITIVE FOR WATER SUPPLIES

This is a continuation, of application Ser. No. 596,368, filed July 16, 1975, abandoned.

This invention relates to a safe and effective chemical means for preventing the development of carcinogens produced by chlorine disinfection of potable water supplies and for destroying preformed carcinogens in a carcinogen contaminated potable water supply.

There are an infinite number of organic substances commonly contained in natural and waste waters which react rapidly with chlorine to produce toxic compounds some of which are carcinogenic. In a great majority of instances the chemical identification of carcinogens remains to be established, but their presence is presumptively demonstrable by relatively simple chemical and biological tests.

Recent procedures for identifying some carcinogens are capable of isolating and measuring nomogram quantities of volatile and semi-volatile organic materials in water. These procedures have successfully indicated the presence of organochlorine compounds and some brominated hydrocarbons in the tap water of numerous cities. Details for the chromatographic technique involved in these procedures are available from various Environmental Protection Agency laboratories located in several cities.

The incidence of carcinogen formation as a result of chlorine disinfection of water supplies is greatly enhanced in typical swimming pools. Carcinogens may be present in the potable water supply as it is added to the pool. Thereafter, it is quite normal for additional quantities of chlorine to be added to the pool water for additional sanitization. In addition, it is quite customary to periodically increase the chlorine content in a swimming pool to a quite substantial level in order to destroy algae or other organisms contained therein. It should also be noted that environmental airborne pollutants will fall into a swimming pool, many of these pollutants being organic in nature, and will be chlorinated thereby producing more toxic and carcinogenic compounds. Of course, it should be recognized that additional sources of organic matter entering a swimming pool include human waste excreta such as urine and body secretions such as perspiration, and an abundant amount of exfoliated dermal epithelium which is shed into the swimming pool where amino acids are dissolved out of the protein. These amino acids react with chlorine and are converted to carcinogens by the oxidant property of chlorine. In sum, it should be recognized that swimming pool water supplies contain considerably greater amounts of toxic and carcinogenic compounds than those amounts reported for many municipal drinking water supplies.

Although the amount of carcinogenic compounds found in potable water supplies are measured in parts per billion rather than parts per million, the massive impact caused by cancer necessitates a serious consideration of the physiological significance of such carcinogens. This is especially true because of the growing realization that the majority of human cancers are chemical in origin and that an estimated 60 to 80 percent of human cancers are of environmental origin. While it is factual that at this time the amounts of carcinogens are comparatively small in connection with potable water supplies, but somewhat greater in the case of swimming pool water, it is also recognized that low levels of carcinogens, to which the population is exposed, may be responsible for the majority of human cancers, thereby contradicting any view that such small quantities of carcinogens are too little to be of significance.

Since there is no scientific evidence that a known threshold exists for any chemical carcinogen, the Surgeon General of the United States Public Health Service concluded that "no level of exposure to a carcinogen should be considered toxicologically insignificant for man." Delaney's amendment to the Food Drug and Cosmetic Act imposes a zero tolerance for carcinogenic food additives, and water is by far the single largest food substance.

As opposed to drinking water, swimming pool water is ingested in inappreciable quantities. However, the entire skin surface of the bather is in cutaneous contact with carcinogen solutes and in addition, since many of the carcinogens are volatile (such as many derived from human urine), cutaneous contact is supplemented by the inhalation of carcinogens. There is every reason to accept the view that a zero carcinogen level in swimming pool water removes another environmental source of cancer producing potential, particularly when such carcinogens can be prevented from forming and can be destroyed once they are formed.

Therefore, it is desirable to reduce the carcinogen levels in potable water to as low a level as possible. Consequently, it is an object of the present invention to provide an additive which effectively and safety reduces the carcinogen levels of potable water supplies and prevents the formation of additional carcinogens in those water supplies. These and other objects, features and advantages will become apparent from a review of the following description of the present invention.

According to the present invention, it has been discovered that ascorbic acid and dehydroascorbic acid possess the unique ability of destroying existing carcinogens in potable water supplies and preventing the formation of additional quantities of such carcinogens in those supplies.

Ascorbic acid oxidizes to dehydroascorbic acid under the influence of appropriate oxidizing agents such as chlorine, ozone, hydrogen peroxide, and the like. Both ascorbic acid and dehydroascorbic acid are antiscorbutic, that is, both act as Vitamin C and both ascorbic acid and dehydroascorbic acid neutralize carcinogens.

Stoichiometrically, 176 parts of ascorbic acid are oxidized by 2 parts of chlorine. In other words, 70.9 parts of ascorbic acid form 174 parts of dehydroascorbic acid and 72.9 parts of hydrochloric acid. Therefore, 1 part of "free" chlorine reacts with 2.48 parts of ascorbic acid (for convenience this figure is rounded off to 2.5 parts).

If, therefore, it is desired to maintain a free chlorine level of 2 ppm in a water supply, and at the same time decarcinogenate the water supply, it is achieved by raising the chlorine level of the water supply to twice the desired level, to 4 ppm, and adding 2.5 ppm of ascorbic acid per 1 ppm of chlorine available for oxidation, 5 ppm of ascorbic acid. In this fashion 2 ppm of the chlorine are converted to 2 ppm of hydrochloric acid thereby reducing the free chlorine to 2 ppm, the desired level, and providing 5 ppm of dehydroascorbic acid for neutralizing preformed carcinogens and preventing the formation of new carcinogens.

The reaction between ascorbic acid and chlorine may be shown as follows:

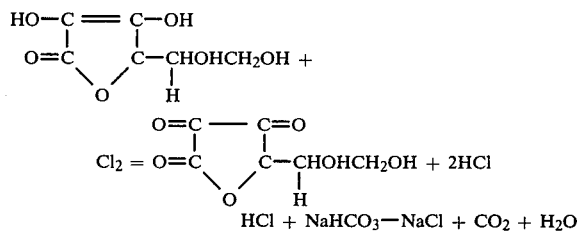

$$HCl + NaHCO_3 \rightarrow NaCl + CO_2 + H_2O$$

An alkaline material such as sodium bicarbonate may be used to neutralize the hydrochloric acid.

| MW | ascorbic acid | 176 |
|---|---|---|
|  | dehydroascorbic | 174 |
|  | HCl | 36.45 |
|  | NaHCO$_3$ | 84 |

To establish the results of this invention in statistically significant trials it was necessary to perform chromatographic analyses on carcinogen-containing water samples. Known carcinogens react chemically and biologically by relatively simple tests that are useful for screening purposes. Chemically, filter paper dipped in a chloroform solution of acridine and subsequently dried to expel all the chloroform develops a yellow spot if touched with a carcinogen containing concentrate of a water sample known from chromatographic analysis to contain carcinogens. Usually, the intensity of the yellow color is roughly indicative of the concentration of carcinogen, so that a crude but helpful measure of the effectiveness of any treatment may be followed by successive screening tests. Biologically, use is made of the photodynamic toxicity exhibited by carcinogens toward *Paramecium caudatum* immersed in water, as in a hanging drop preparation, to which a carcinogen solution in water is added. This phenomenon is conveniently observed under an ordinary light microscope even at low power. Long ultraviolet light rays acting upon the sensitized organism are responsible for the rapid killing of the paramecia. No special illuminating system to provide the ultraviolet light is required because the destructive rays for this phenomemon readily penetrate the optical glass system of the microscope. Ultraviolet light in the range of 4000 Angstrom units is effective for this purpose.

Sources of carcinogen containing water are innumerable and easily available. Such water may be prepared with little difficulty by liquid-liquid recovery of carcinogens from human urine. This is accomplished by extracting human urine with anhydrous ethyl ether, allowing the ether extract to evaporate spontaneously, and testing the residue made up with minimum amounts of water (free from detectable carcinogens) by a conventional "spot test" technique.

Benzopyrene produces a yellow color on acridine test paper. By preparing a benzopyrene solution of known concentration, and by spot testing with a measured capillary drop of test solution, an approximate estimate of the quantity of carcinogen compared with the benzopyrene standard is sufficient for indicating the success of any treatment, more especially since the end point sought is total extinction of reaction signifying destruction of carcinogens. For practical purposes a 1:250,000 solution of benzopyrene in water touched dropwise to acridine test paper provides a yellow color whose intensity is arbitrarily set at + + + + (four plus).

Similarly, the concentration of carcinogens recovered from 1 liter of water containing benzopyrene at the 1:250,000 level is used for the paramecia test. At this concentration death takes place within one minute, many times considerably less, but never more than five minutes. Survival of paramecia beyond 30 minutes indicates complete absence of carcinogens.

Starting with carcinogenated water, made so by the addition of an ethyl ether extract of urine and diluted with doubly distilled water freed from pyrogens by distilling over potassium permanganate, and diluted until the acridine test reads + + + + (this is an approximation), the addition of ascorbic acid (vitamin C) in adequate quantity completely extinguishes the acridine paper test and prevents the treated sample from killing paramecia. Chromatography confirms this finding.

Tested in reverse, by adding carcinogens to an ascorbic acid solution, both a negative acridine and negative paramecia killing test are obtained.

It is important to recognize that something more than the reducing activity is involved in the results of this invention. Chlorine may be inactivated by adding sodium thiosulfate instead of ascorbic acid. Although chlorine inactivation is procured, there is no deactivation of carcinogens or prevention of carcinogen formation as had been the case with ascorbic and dehydroascorbic acid. 7500 gallons of city (San Pedro, Calif.) water were introduced into a pool measuring 18 feet in diameter and 4 feet deep, thereby representing approximately 1,000,000 avoirdupois ounces. By membrane filter technique the water met U.S. Public Health microbiological requirements, 1 colony or less per milliliter of sample. Two gallons of human urine were mixed into the filled pool for carcinogen supply thereby providing a strongly positive test (acridine, paramecia and chromatographic confirmation). Five ounces of ascorbic acid were next introduced and chlorine gas amounting to 4 ounces were used to disinfect the water. After 1 hour the pool was free from coliform bacteria and the acridine test for carcinogens was entirely negative. A second test was performed this time using sodium thiosulfate as the reducing agent. Stoichiometrically, 4.48 parts of thiosulfate are required to neutralize 1 part of chlorine, so that 18 ounces of thiosulfate were added to the water before introducing the 4 ounces of chlorine. After 1 hour, there were no coliforms present using the micropore monitor for colon bacilli; but the carcinogens were again strongly present (acridine test and chromatographic confirmation). Other than its reducing power, ascorbic acid attacks carcinogens as distinguished from thiosulfate which neutralizes the chlorine but has no effect on the carcinogens.

It should be noted that in those instances where it is not necessary to maintain a free chlorine level in a water supply, ascorbic acid may be added to the water supply in substantially larger quantities than 2.5 ppm. Since ascorbic acid is not toxic to humans in relatively small doses and may be consumed internally in the form of vitamin C, there does not appear to be a practical maximum for the amount of ascorbic acid added to a water supply.

In a preferred embodiment of the present invention, copper sulfate is used in conjunction with ascorbic acid in deactivating carcinogens and preventing the formation of carcinogens. It has been found that adding copper sulfate to the ascorbic acid as it is added to a water supply hastens the oxidation of the ascorbic acid approximately four fold and improves the overall activity and effectiveness of the ascorbic acid.

Suitable results are obtained when from between 0.05 and 5 ppm of copper sulfate are added to a water supply. Preferred results are obtained when 0.05 to 1 ppm of copper sulfate are employed. Normally desirable results are obtained when 0.3 ppm of copper sulfate are employed.

By using as much as 5 ppm copper sulfate it is possible to also destroy or deactivate resistant forms of algae such as Colothrix, Chara, Nitella and Endorina. Smaller quantities of copper sulfate will also be effective in destroying or deactivating the more susceptible forms of algae such as Anobena, Anacystis, Closterium, and Synura. 5 ppm is a practical maximum for copper sulfate because of human toxicity considerations.

In the swimming pool previously mentioned as containing 7,500 gallons of water (1,000,000 ounces avoirdupois), 4 ounces of chlorine will establish a free chlorine level of 4 ppm. If the desired level of chlorine is 2 ppm, the free chlorine may be reduced by adding 5 ounces of ascorbic acid. The free chlorine is reduced to 2 ppm and 5 ppm of dehydroascorbic acid and 2 ppm of hydrochloric acid are produced. Each part of chlorine reduced produces one part of hydrochloric acid.

The hydrochloric acid is neutralized by adding 2.3. ppm of sodium bicarbonate ($HCL + NaHCO_3 = NaCl + CO_2 + H_2O$, that is 36.45 parts of HCL are neutralized by 84 parts of sodium bicarbonate and therefore 1 part of HCL is neutralized by 2.3. parts of sodium becarbonate). Adding copper sulfate to the ascorbic acid hastens the oxidation four fold and improves the overall activity such as to furnish greater effectiveness. Copper sulfate is added so as to produce 0.3 ppm of the copper salt, or, in 7500 gallons, 3/10ths of an ounce.

The following combination of ascorbic acid, copper sulfate and sodium becarbonate will decarcinogenate and prevent the formation of carcinogens for each 1000 gallons of water containing 1 ppm of free chlorine. Since the ascorbic acid will reduce the chlorine in the proportion of 2.5 parts of ascorbic for each part of chlorine, the free chlorine in this instance is increased to 2 ppm. This will require 0.27 ounces of free chlorine per 1000 gallons of water. To reduce half of this amount of chlorine to HCL requires 0.33 ounces of ascorbic acid. To produce a level of 0.3 ppm of copper sulfate requires 0.04 ounces of copper sulfate. To neutralize the HCL formed requires 0.31 ounces of sodium becarbonate. Therefore, for each 1000 gallons of water to be treated and maintained at a 1 ppm level of free chlorine, use chlorine to satisfy demand and add an excess of 2 ppm of free chlorine. Then add a mixture containing

| ascorbic acid | 9.46 grams |
| Copper sulfate | 1.14 grams |
| Sodium bicarbonate | 9.03 grams |

A filler may be used to carry these materials as is customary in the water sanitization industry.

It should be understood that it may not be necessary to add sodium bicarbonate since only a very small quantity of hydrochloric acid is produced and most water supplies are maintained in a slightly alkaline condition, sufficient to deactivate the hydrochloric acid.

The following examples demonstrate the effectiveness of the present invention in the prevention of formation of carcinogens and the deactivation of carcinogens.

EXAMPLE I

Epithelial exfoliation is accomplished by rubbing the skin of the forearm vigorously and collecting the cells as they are shed into a shallow dish. To the desquamated cells, a water solution containing calcium hypochlorite such as to register 2 ppm of free chlorine, measured by conventional orthotolidine colorimetry, is added to the cells. After overnight rest, the solution tested for carcinogens shows a positive test and may be concentrated to give a + + + + acridine test paper reaction. Adding 2.5 ppm ascorbic acid to the carcinogen containing solution extinguishes the test and completely destroys the carcinogens.

EXAMPLE II

This is the reverse of Example I, and proceeds as follows: the epithelial cell suspension is treated with ascorbic acid, using a level of 2.5 ppm. Addition of calcium hypochlorite to furnish a level of 2 ppm of available chlorine, colorimetrically measured with orthotolidine, fails to develop a positive acridine test and fails to kill paramecia. Ascorbic acid has prevented the development of carcinogens.

EXAMPLE III

Example I is repeated but sodium hypochlorite is used instead of calcium hypochlorite. Free chlorine measured 2 ppm. Both the acridine test and the paramecium test indicated the destruction of all carcinogen reactions.

EXAMPLE IV

This is a repetition of Example II in reverse, using sodium hypochlorite instead of calcium hypochlorite. Ascorbic acid prevented the development of carcinogens produced by chlorine reacting with protein extract representing skin proteins.

Vegetation of various sorts, leaves for example, fall into swimming pools. Humic substances are extracted from such vegetation. Often, the water acquires a slight brown color from the products of humic acid derivation. When these products are chlorinated by whatever manner, carcinogens appear. They can be prevented from appearing and destroyed once they have appeared, as the following examples indicate:

EXAMPLE V

Dried and partially decayed leaves were extracted with water (free from carcinogens as tested with acridine test paper and photodynamic killing of paramecia). The solution was incubated at 37° C. overnight and the next day calcium hypochlorite was added to provide a free chlorine level of 2 ppm. By concentration and resolution as required, an acridine paper test about equivalent to a + + + + "standard" (benzopyrene) was established. To this solution ascorbic acid was added at a level of 20 ppm. Within an hour, acridine test paper and paramecium tests were negative. Preformed carcinogens were extinguished.

EXAMPLE VI

Example V was duplicated using sodium hypochlorite as the source of chlorine introduced to produce a level of 2 ppm. Ascorbic acid destroyed the tests by removing the carcinogens.

EXAMPLE VII

By reversing tests V and VI, that is by adding 20 ppm of ascorbic acid to water, chlorinating either with calcium hypochlorite or sodium hypochlorite to 2 ppm, and then adding the carcinogenated water recovered from decayed humic acid materials extracted from leaves, no carcinogens developed and those present were destroyed.

Human urine, from normal or diseased individuals, contains volatile carcinogens. These may be extracted with anhydrous ethyl ether. Such extracts are rid of their carcinogens by treating with an adequate amount of ascorbic acid.

EXAMPLE VIII

An anhydrous ethyl ether extract of urine contained a greater than + + + + carcinogen content as indicated by the acridine test paper procedure. Addition of 45 ppm of ascorbic acid results in a negative acridine and a negative paramecium test. Ascorbic acid destroys the carcinogens that are present in human urine.

Miami, Fla. drinking water was reported publicly in the news media as showing a relatively high carcinogen content compared, for instance, with water examined at New Orleans (about 2½ times greater content in Miami than in New Orleans water). The following is an analysis of the Miami, Fla. water showing reported carcinogens:

|  | ppm |
| --- | --- |
| Alkalinity (CaCO$_3$) | |
| phenolphthalein | 52 |
| methyl orange | 74 |
| Hardness (CaCO$_3$) | |
| Non-carbonate | 41 |
| Total | 94 |
| Carbon dioxide (free CO$_2$) | 2 |
| Chloride residual | 1.8 |
| Ammonia nitrogen | 0.2 |
| Nitrogen (NO$_3$) | 0.4 |
| Chlorides | 56 |
| Fluorides | 1.2 |
| Sulfates | 34 |
| Calcium | 29 |
| Iron | 0.2 |
| Magnesium | 8.0 |
| Sodium & Potassium (as Sodium) | 28 |
| Silica (SiO$_2$) | 10 |
| Turbidity | nil |
| Total solids | 216 |
| Electrical conductivity (Ec × 10$^6$ 25° C.) | 325 |
| Color | 8 |
| pH | 8.8 |

This water contained carcinogens as indicated by a positive acridine paper test and the paramecia test. This water is used extensively for filling swimming pools in the Greater Miami area. According to the EPA, the carcinogen content of this water was found to be two and a half times greater than that for New Orleans.

A swimming pool filled with this water gave a low carcinogen acridine paper test with the anhydrous ethyl ether extract recovered from 1 liter samples. After a week end of use by bathers with an average daily load of 35 individuals (which included 11 children under 12 years of age) the acridine paper test rose to + + + + and lesser dilution was required for killing paramecia than was necessary before the bather load occurred.

To this pool, ascorbic acid was added as indicated in the following example.

EXAMPLE IX

A 15,000 gallon capacity swimming pool (connected with a motel accommodating about 80 guests) showed an acridine test paper reading of about + + + + after a week end of comparatively heavy use. 15,000 gallons of water represent approximately 125,100 pounds (8.34×15,000). To this amount of water 2.5 pounds of ascorbic acid was added, and after one hour the acridine test was conducted. An entirely negative acridine test resulted. Paramecia were no longer killed after an hour of exposure. Gas chromatography was negative for carcinogens. Ascorbic acid at a level of 20 ppm completely extinguished all carcinogen reacting substances shown by acridine test paper, paramecia biological test and confirmed by gas chromatography.

Another swimming pool, privately owned and used by the family of four, frequently developed algae (Phormidium). It showed a carcinogen equivalent to a + + + or + + + + rating against the conventional benzopyrene arbitrary standard adopted for these tests. Addition of ascorbic acid at a level of 20 ppm eliminated carcinogens.

EXAMPLE X

Swimming pool water containing an unidentified blue-green algae and acridine reacting carcinogens was treated with a mixture of ascorbic acid and copper sulfate. Mixture of the two components varied in order to ascertain what proper mixture, if any, afforded results different from those obtained using ascorbic acid along at a level of 20 ppm. The schedule of doses and the findings obtained with respect to the activity against carcinogens is provided as follows:

| Sample No. | Ascorbic Acid ppm | Copper Sulfate ppm | Acridine Test |
| --- | --- | --- | --- |
| 1 | 0 | 0 | + + + + |
| 2 | 5 | 0 | + + + + |
| 3 | 10 | 0 | + + |
| 4 | 15 | 0 | + |
| 5 | 20 | 0 | 0 |
| 6 | 0 | 0.1 | + + + + |
| 7 | 5 | 0.1 | + + + |
| 8 | 10 | 0.1 | 0 |
| 9 | 5 | 0.2 | + + |
| 10 | 5 | 0.3 | 0 |

Copper increases the effectiveness of ascorbic acid such that as little as 0.3 ppm of copper sulfate enhances the decarcinogenating effectiveness of ascorbic acid by four fold.

EXAMPLE XI

A 15,000 gallon swimming pool containing + + + + acridine carcinogenic contamination was treated with 11 ounces of a mixture containing 10 ounces of ascorbic acid and 0.6 ounces of copper sulfate. This represents approximately 5 ppm of the mixture. The acridine test was negativated, the paramecia survived over an hour and gas chromatography gave evidence of the extinction of all carcinogenic reactants. In this example algal growth was suspended and the mixture at a level of 5 ppm furnished proof that the bioassay gave a positive finding of algaecidal activity against *Chlorella pyrenoidosa.*

Copper sulfate is used extensively as an algaecide at much higher levels than that required to rid a pool of carcinogens. Up to 12 ppm are considered non-toxic and reservoirs are treated at such levels to rid drinking water of algae. Three hundred milligrams of copper sulfate constitute an emetic dose, so that swallowed in high dilutions in water a swimming pool containing 0.3 ppm of copper sulfate would cause emesis if 10 liters of such water (2¾ gallons) are swallowed. Ascorbic acid is used in amounts up to 1 even 2 grams per dose and offers no toxicological problem in the low level of use as disclosed in this invention, with or without added copper salts.

It will further be obvious that the foregoing relates only to disclosed embodiments of the present invention, and that numerous alterations and modifications may be made therein without departing from the spirit and the scope of the invention as defined in the following claims.

We claim:

1. Method of treating a water supply to sanitize the water supply, reduce carcinogen concentration in the water supply and prevent the formation of carcinogens in the water supply comprising the steps of adding chlorine to the water supply to a concentration in excess of the amount needed to sanitize the water supply; and adding a concentration of ascorbic acid thereto sufficient to inactivate an amount of chlorine equal to the excess of the chlorine over the amount needed to sanitize the water supply;

said concentration of ascorbic acid being sufficient to destroy existing carcinogens and prevent the formation of carcinogens while leaving a residual free chlorine concentration in the water supply sufficient to sanitize the water supply.

2. Method of claim 1 wherein copper sulfate in a concentration calculated to catalyze the inactivation of chlorine by the ascorbic acid, is added to reduce the amount of ascorbic acid needed to destroy existing carcinogens and prevent the formation of carcinogens.

3. Method of claim 2 wherein the concentration of copper sulfate is 1.5% of the concentration of ascorbic acid needed in the absence of copper sulfate, and said lesser concentration of ascorbic acid is 25.0% of the concentration of ascorbic acid needed in the absence of copper sulfate.

* * * * *